(12) United States Patent
Kathawala et al.

(10) Patent No.: US 10,338,841 B2
(45) Date of Patent: Jul. 2, 2019

(54) BLOCK MANAGEMENT FOR DATA STREAMS

(71) Applicant: Western Digital Technologies, Inc., San Jose, CA (US)

(72) Inventors: Gulzar A. Kathawala, Fremont, CA (US); Liam Parker, Edinburgh (GB); Kroum Stoev, Pleasanton, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 24 days.

(21) Appl. No.: 15/633,831

(22) Filed: Jun. 27, 2017

(65) Prior Publication Data

US 2018/0373431 A1 Dec. 27, 2018

(51) Int. Cl.
*G06F 12/00* (2006.01)
*G06F 3/06* (2006.01)
*G06F 12/02* (2006.01)
*G06F 11/10* (2006.01)

(52) U.S. Cl.
CPC ............ *G06F 3/064* (2013.01); *G06F 3/0619* (2013.01); *G06F 3/0659* (2013.01); *G06F 3/0688* (2013.01); *G06F 11/108* (2013.01); *G06F 11/1076* (2013.01); *G06F 12/0238* (2013.01); *G06F 12/0246* (2013.01); *G06F 2212/7204* (2013.01)

(58) Field of Classification Search
CPC ...... G06F 3/064; G06F 3/0619; G06F 3/0659; G06F 3/0688; G06F 12/0238; G06F 12/0246; G06F 2212/7204; G06F 11/1076; G06F 11/108
See application file for complete search history.

(56) References Cited

U.S. PATENT DOCUMENTS

| 9,563,397 | B1 | 2/2017 | Stoev et al. |
| 2014/0337689 | A1 | 11/2014 | Khan |
| 2015/0186270 | A1 | 7/2015 | Peng et al. |
| 2017/0091022 | A1* | 3/2017 | Khan ................... G06F 11/1068 |
| 2018/0039415 | A1* | 2/2018 | Peng ..................... G06F 3/0604 |
| 2018/0190329 | A1* | 7/2018 | Kathawala ............... G11C 7/04 |

* cited by examiner

*Primary Examiner* — Shawn X Gu
(74) *Attorney, Agent, or Firm* — Patterson & Sheridan, LLP; Steven Versteeg

(57) ABSTRACT

Embodiments of the present disclosure generally relate to SSD management of non-volatile memory blocks for writing multiple data streams. The SSD may include a non-volatile memory organized into a number of superblocks. Each superblock includes a number of streamblocks. In one embodiment, a method of operating the SSD includes receiving a data stream, identifying an open superblock, identifying an available streamblock from the open superblock, and assigning the data stream to the available streamblock from the open streamblock. In another embodiment, a method of operating the SSD includes receiving a first data stream and a second data stream, writing the first data stream to the first streamblock and writing the second data stream to the second streamblock, and calculating a combined XOR parity information for the first streamblock and the second streamblock.

24 Claims, 6 Drawing Sheets

BLOCK MANAGEMENT FOR DATA STREAMS

BACKGROUND OF THE DISCLOSURE

Field of the Disclosure

Embodiments of the present disclosure generally relate to solid state drive (SSD) management of non-volatile memory (NVM) blocks for writing multiple data streams.

Description of the Related Art

SSDs are negatively affected by write amplification due to the block erase nature of NAND operation. SSDs free up storage space consumed by invalid pages through the process of garbage collection. To free up space in a block that has both valid (existing) data and invalid data (data marked to be erased), the SSD erases the entire block and moves or re-writes the valid data to a new block. The process of re-writing valid data consumes more physical capacity as compared to the logical capacity of the SSD and amplifies the total writes performed by SSDs. SSDs are over-provisioned to compensate for this need of more physical capacity compared to logical capacity. Depending on the amount of over-provisioning on a SSD, the write amplification factor can be anywhere from almost 1 to infinity.

Data streams are sequential workloads received by a SSD from a host to increase the throughput of a SSD. However, if multiple data streams are written together to the same pool of blocks or superblock of a SSD, then the sequential workloads change to random workloads resulting in performance degradation of the SSD and increased write amplification of the SSD. Therefore, there is a need for an improved method of operating SSDs.

SUMMARY OF THE DISCLOSURE

Embodiments of the present disclosure generally relate to SSD management of non-volatile memory blocks for writing multiple data streams. In one embodiment, a method of operating a SSD includes organizing a non-volatile memory into a number of superblocks. Each superblock includes a number of streamblocks. The method further includes receiving a data stream, identifying an open superblock, identifying an available streamblock from the open superblock, and assigning the data stream to the available streamblock from the open streamblock. In another embodiment, a method of operating a SSD includes organizing a non-volatile memory. The non-volatile memory includes a superblock having a first streamblock and a second streamblock. The method further includes receiving a first data stream and a second data stream, writing the first data stream to the first streamblock and writing the second data stream to the second streamblock, and calculating a combined XOR parity information for the first streamblock and the second streamblock. In yet another embodiment, a method of operating a SSD includes organizing a non-volatile memory into a number of superblocks. Each superblock includes a number of streamblocks and a permanent XOR block. The method further includes writing a first data stream to a first set of streamblocks within one of the superblocks and writing a second data stream to a second set of streamblocks within the same superblock.

In one embodiment, a SSD includes a controller and non-volatile memory including a number of superblocks. Each superblock includes a number of streamblocks. The SSD includes memory operation instructions that, when executed by the controller cause the controller to receive a first data stream, to assign the first data stream to a first streamblock from a first superblock, to receive a second data stream, and to assign the second data stream to a second streamblock from the first superblock. In another embodiment, a SSD includes a controller and a means for organizing a superblock of non-volatile memory into a number of superblocks including a number streamblocks. The SSD includes memory operation instructions that, when executed by the controller, cause the controller to receive a number of data streams and to store the data streams to separate streamblocks of one of the superblocks.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Embodiments of the present disclosure generally relate to solid state drive (SSD) management of non-volatile memory blocks for writing multiple data streams. For example, SSD management of assigning multiple data streams across multiple pool blocks of non-volatile memory, such as NAND flash memory, to avoid data streams being written to one pool of blocks.

Figure 1:
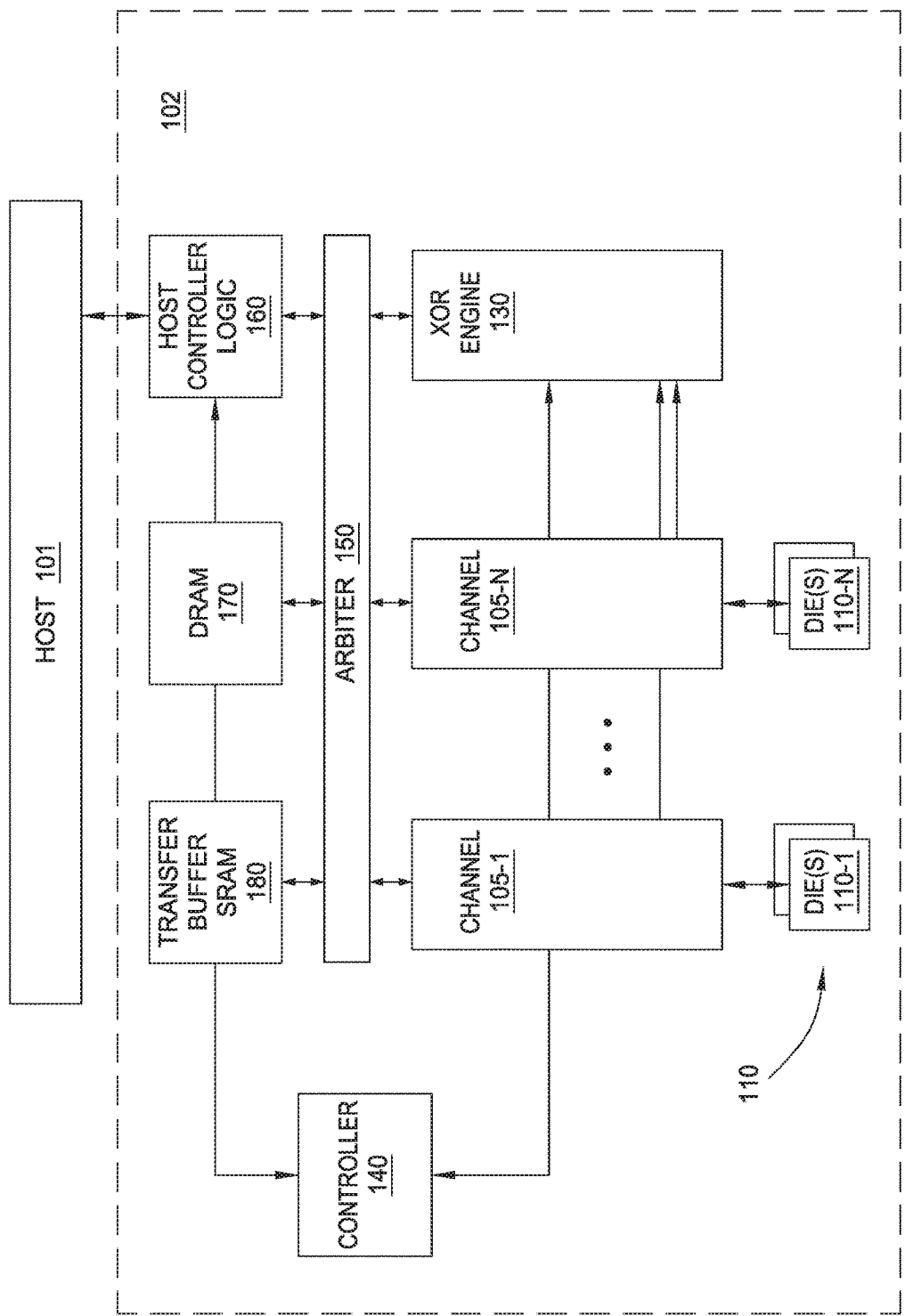
FIG. 1 is a schematic diagram of one embodiment of a SSD.

FIG. 1 is a schematic diagram of one embodiment of a SSD 102 suitable for implementing the present invention. SSD 102 operates with a host 101 through a host interface. SSD 102 may be in the form of a removable memory such as a memory card or may be in the form of an embedded memory system. SSD 102 includes NVM 110 controlled by a controller 140. NVM 110 includes one or more arrays of non-volatile memory cells, such as multiple memory dies 110-1 to 110-n. Memory die(s) 110-1 to 110-n may represent any configurations or any types of memory dies or devices arranged to store data accessible via channels 105-1 to 105-n.

Controller 140 is configured to direct read, write, or erase operations to memory die(s) 110-1 to 110-n via channels 105-1 to 105-n. SSD 102 may further include an arbiter 150, a host controller logic 160, a dynamic random access memory (DRAM) 170, and/or a transfer buffer static random access memory (SRAM) 180 to facilitate controller 140 in read, write, or erase operations to memory die(s) 110-1 to 110-n.

NVM 110 may be configured for long-term data storage of information and retain information after power on/off cycles. NVM 110 can include one or more memory devices. Examples of NVM devices include flash memories, phase change memories, ReRAM memories, MRAM memories, electrically programmable read only memories (EPROM), electrically erasable programmable read only memories (EEPROM), and other solid-state memories. NVM devices may also have different configurations. For example, flash memory devices may be configured in a NAND or a NOR configuration.

Figure 2:
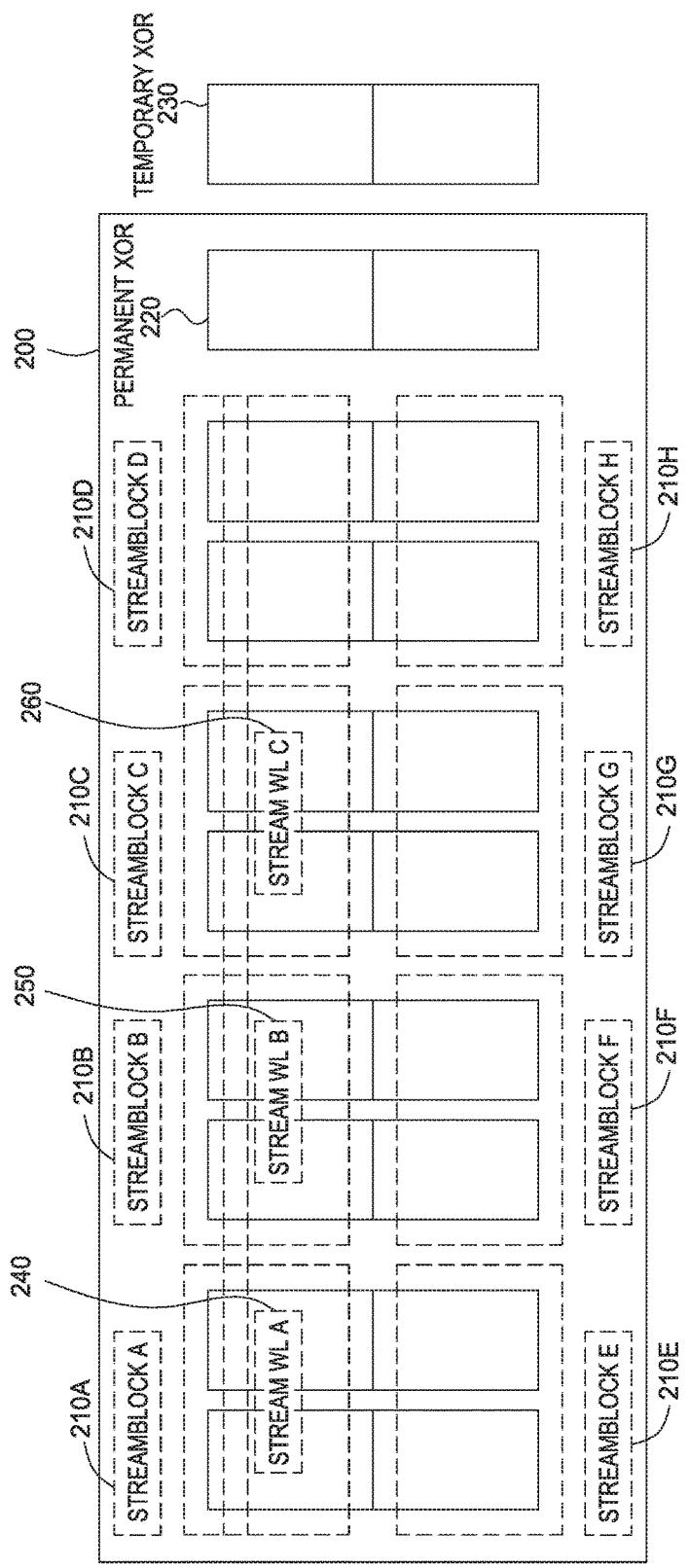
FIG. 2 is a schematic diagram of one embodiment of organizing non-volatile memory into a plurality of streamblocks.

FIG. 2 is a schematic diagram of one embodiment of organizing NVM 110. NVM 110 is divided into superblocks 200. Superblock 200 is divided into a number of streamblocks 210A-210H. In FIG. 2, one superblock 200 is shown which is further sub-divided into eight (8) streamblocks 210A-H. In certain embodiments, an active stream is assigned to one set of one or more streamblock 210A-H. In other words, two data active stream may not be simultaneously writing to the same streamblock at the same time.

Superblock 200 may be sub-divided into any number of streamblocks 210A-210H, and streamblocks 210A-210H may be made up of any number of blocks for any desired storage size. For example, one streamblock 201 may having a storage size of between 256 MB to 512 MB in certain embodiments. In certain embodiments, the superblocks are dived into eight or more streamblocks. In certain embodiments, dividing a superblock into eight (8) streamblocks or more is preferred. SSD may write a single active data stream to one or more streamblocks. The number of streamblocks per data stream can be dynamically adjusted based on the data flow of the data stream.

Memory die 110-1 may be any size. Memory die 110-1 may be subdivided into any number of superblocks 200. Superblocks 200 may be sub-divided into any number of streamblocks 210A-210H, and streamblocks 210A-210H may be subdivided into any number of blocks, and the blocks may be contain any number of memory storage capacity. One example of memory die 110-1 is NVM of 3D NAND BiCS3 array having a memory storage capacity of 64 gigabytes.

Exclusive OR (XOR) parity information may be used to improve reliability of SSD 102, such as enabling data recovery of failed writes or failed reads of data to and from NVM or enabling data recovery in case of power loss. The reliability may be provided by using XOR parity information generated or computed based on data stored to SSD 102. SSD 102 may include a XOR engine 130 with logic and/or features to generate XOR parity information.

For example, data that spans across multiple streamblocks 210A-210H of one superblock 200 may be XORed together to compute XOR parity information. An XOR stripe may include any data stored in these streamblocks 210A-210H that are XORed together to compute XOR parity information. For example, data from a first word line 240 spanning streamblock 210A of superblock 200 may be XORed together forming a first XOR stripe. Data from a second word line 250, such as a word line have the same physical word line number as word line 240, spanning streamblock 210B of superblock 200 may also be XORed together forming a second XOR stripe. The first XOR strip and the second XOR strip are combined to form a combined XOR parity information. In the event that an uncorrectable error is attributed to at least a portion of data in the first word line 240 or the second word line 250, the combined XOR parity information may be used to recover the portion of data.

In certain embodiments, SSD 102 further includes a permanent XOR block 220 to permanently store XOR parity information and temporary XOR block 230 to temporarily store XOR parity information. Temporary XOR block 230 temporarily stores XOR parity information for frequent updating as data streams are being written to streamblocks 210A-210H of superblock 200 and for subsequent storage in permanent storage in permanent XOR block 220.

In certain embodiments, permanent XOR block 220 is a dedicated pool of blocks of superblock 200. Permanent XOR block 220 of superblock 200 may have the same data format as streamblocks 210A-210H of superblock 200. For example, data stored in TLC or X3 memory cells may have XOR parity information stored in permanent XOR block 220 in triple level cells (TLC) or X3 memory cells.

In certain embodiments, temporary XOR block 230 is a dedicated pool of blocks of SSD 102 separate from superblock 200. Temporary XOR block 230 may be on the same NVM memory die 110-1. In other embodiments, temporary XOR block 230 may be on a separate NVM memory die 110-N. The separate NVM memory die 110-N may be other types of memory storage, such as ReRAM, PCM, or MRAM. Temporary XOR blocks 230 may come from dies that have the most number of good blocks improving the block utilization of SSD 102 and reducing over-provisioning for temporary XOR block 230.

Since writes to temporary XOR block 230 occur more often than writes to streamblocks 210A-210H, temporary XOR block 230 need higher endurance. In certain embodiments, temporary XOR block 230 operates to temporarily store XOR parity information in memory cells storing two bits per cell or less, such as SCL or X2 memory cells, while superblock 200 operates to store data in memory cells storing three bits per cell or more, such as X3 memory cells or X4 memory cells.

Figure 3:
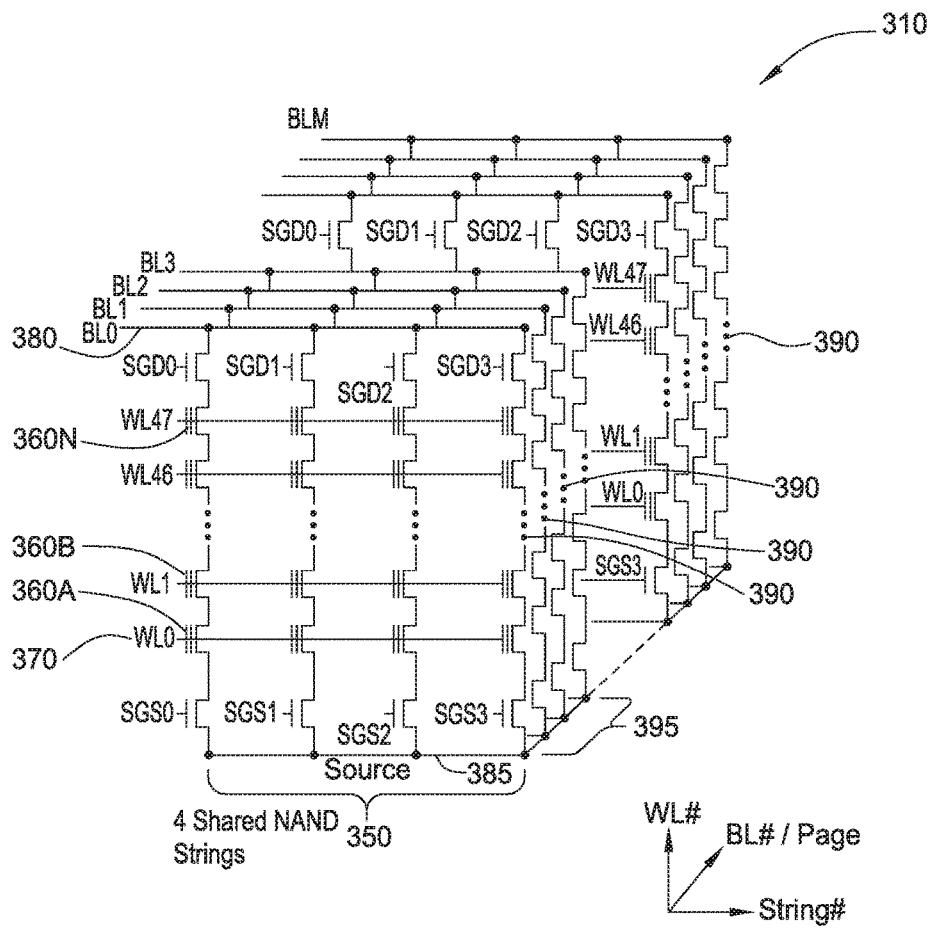
FIG. 3 is a schematic diagram of one example of a 3D memory array.

FIG. 3 is a schematic diagram of one example of a 3D memory array 310, such as a 3D or vertical NAND memory array or a BiCS2 cell array as shown. Memory array 310 is made up of a plurality of pages 390. Each page 390 includes a set of NAND strings 350 (four NAND strings are shown). Each set of NAND string 350 is connected in common to a bit line 380. Each page 390 has its own bit line 380 which number from BL0 to BLM depending on the number of pages 390. Each NAND string 350 includes a select gate drain transistor (SGD), a plurality of memory cells 360, and a select gate source transistor (SGS) 330. A row of memory cells is connected in common to a word line (WL) 370. The number of word lines (WL0, WL1, etc.) depending on the number of memory cells in a NAND string 350.

Memory cells 360 are made up of a transistor that has a charge storage element to store a given amount of charge representing a memory state. The memory cells 360A-360N may be operated in a single-level cell (SLC) storing 1 bit of memory per cell, a X2 cell storing 2 bits of memory per cell, a X3 cell storing 3 bits of memory per cell, a X4 cell storing 4 bits of memory per cell, or any type of memory cell storing any number of bits per cell. Page 390 of FIG. 3 is a group of memory cells that are programmed as a group. Multiple pages 390 make up a block 395. The memory cells in an individual block 395 are typically erased together. A page is the smallest write unit, and a block is the smallest erasure unit.

Embodiments described herein are not limited to three dimensional memory arrays described in FIG. 3 but cover all relevant memory structures as understood by one of skill in the art. Other arrays are possible, such as a three dimensional NAND string formed in a U-shape, two dimensional memory arrays, memory arrays in a NOR configuration, memory arrays made of ReRAM memory cells, or other memory arrays made of storage class memory. Multiple memory arrays may be formed on separate chips and then packaged together to form a stacked-chip memory device. Multiple memory arrays, including mixed types of memory arrays, may be coupled together to form the non-volatile memory of a SSD.

Figure 4:
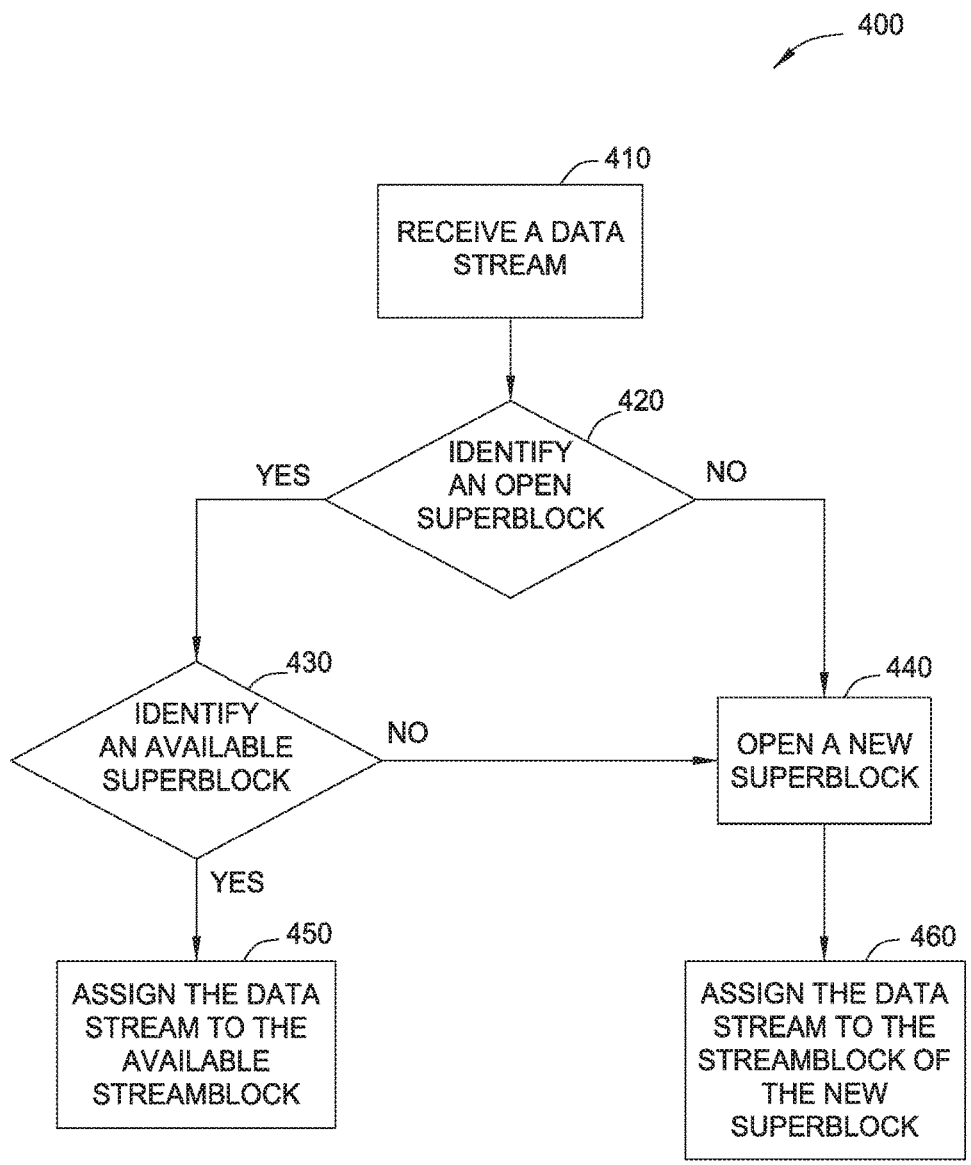
FIG. 4 is a flow chart 400 showing one embodiment of operating a SSD to assign a data stream to a superblock

FIG. 4 is a flow chart 400 showing one embodiment of operating a SSD. For illustration purposes, embodiments of flow chart 400 will be described in reference to SSD 102 of FIG. 1 and superblock 200 of FIG. 2.

At step 410, SSD 102 receives a data stream from host 101. Data streams are sequential workloads identified by host 101 with a particular stream identification. For example, each data stream has its own logical-to-physical address mappings. SSD 102 may receive multiple data streams from host 101 at the same time.

At step 420, SSD 102 identifies an open superblock 200 of NVM 110. Open superblock 200 contains streamblocks 210 that are not fully written or contains pages that may be written to. If there are no open superblocks, then at step 440 a new superblock is opened from a superblock queue. For example, superblocks may be queued in a particular order for wear leveling of SSD 102.

At step 430, an available streamblock, such as one of the streamblocks 210A-210H, is identified from the open superblock 200 identified at step 420. Streamblocks may be unavailable due to streamblocks being already assigned to other active data stream, streamblocks being fully written to, or streamblocks being closed for other reasons. If there are no available streamblocks identified by SSD 102, SSD 102 opens a new superblock from a superblock queue at step 440.

At step 450, SSD 102 assigns the data stream to the available streamblock 210 identified at step 430. Similarly, at step 460, SSD 102 assigns the data stream to an available streamblock 210 from a new superblock opened at step 440 if there are no open super blocks identified at step 420 or if there are no available streamblocks at step 430. In certain embodiments of step 450 and step 460, a data stream can be assigned to two or more streamblocks in a superblock. For example, if SSD 102 identifies uneven workload for different data streams, such as an active first data stream has more significant writes than other active data streams, this active first data stream may be assigned to multiple streamblocks.

Embodiments of operating a SSD as described in reference to flow chart 400 are repeated for each active data stream that is received by SSD 102. Each active data stream is directed into a different streamblock 210 of superblock 200. If an active data steam assigned to one of the streamblocks 210 is stale for a certain period of time, another active data stream may be assigned to store data in the remaining available portions of the streamblock.

In certain embodiments of operating a SSD as illustrate in flow chart 400, SSD writes each data stream to a different streamblock while still maintaining the sequential nature the workloads. In certain embodiments, data streams assigned to different streams reduces garbage collection by reducing the amount of multiple data streams in one superblock 200. If there are reduced data streams in one superblock 200, then there is reduced amount of garbage collection of other data streams when overwriting of a given stream in a superblock. Thus, write amplification is reduced and the amount of over-provisioning required is reduced.

When the workload is sequential in nature, a re-write of a data stream invalidates a significant amount of data in the block where those logical addresses were written previously. The garbage collection process erases the previous block with very little or no data relocation. No data relocation improves the write amplification factor to 1 as the drive does not have to do any additional writes. For sequential workloads, the total flash writes are reduced and therefore over-provisioning requirements are lowered.

Figure 5:
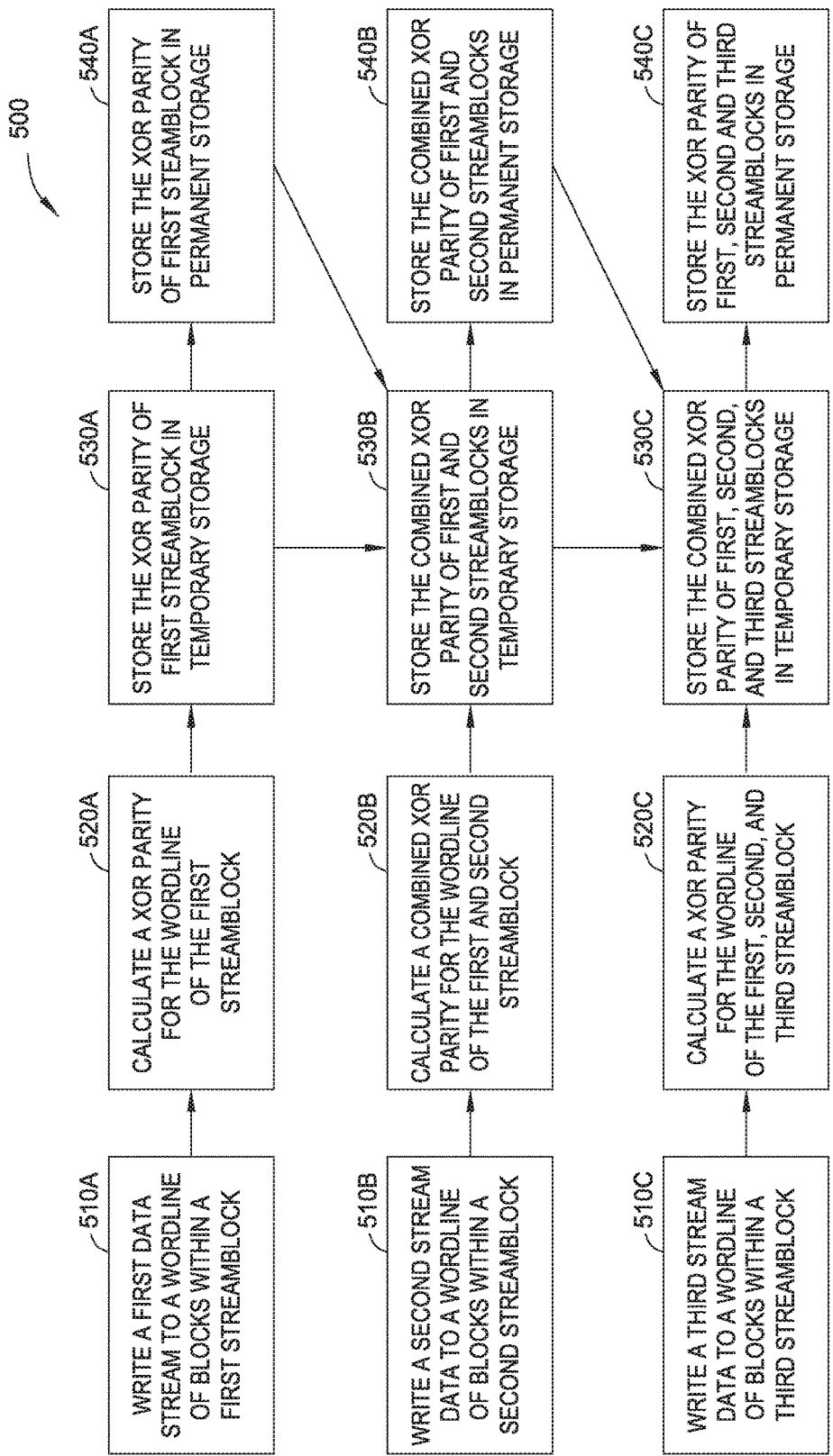
FIG. 5 is a diagram showing one embodiment of operating a SSD utilizing streamblocks and maintaining XOR parity information.

The XOR parity information for each streamblock of a superblock may be maintained separately or the XOR parity information for two or more streamblocks may be combined for a superblock. FIG. 5 is a flow chart 500 showing one embodiment of operating a SSD utilizing streamblocks and maintaining XOR parity information of two or more streamblocks together. For illustration purposes, embodiments will be described in reference to SSD 102 of FIG. 1 and superblock 200 of FIG. 2.

At step 510A, SSD 102 receives a first data stream from host 101. SSD 102 writes the data stream to word line 240 of streamblock 210A of FIG. 2. At step 520A, a XOR parity for word line 240 of streamblock 210A is calculated. In certain embodiments, the XOR parity information may be stored in temporary storage, such as DRAM 170 in FIG. 1 or in temporary XOR block 230 of FIG. 2 at step 530A for further calculation of XOR parity information with other streamblocks 210B-210H. In other embodiments, SSD 102 may skip step 530A and store the XOR parity information in permanent memory, such as to permanent XOR block 220, at block 540A. For example, temporary memory may be unavailable or the XOR parity information may be a final XOR parity information.

At step 510B, SSD 102 receives a second data stream from host 101. SSD 102 may write to word line 250 of streamblock 210B simultaneously or sequentially with step 510A. At step 520B, a combined XOR parity information for word line 250 of streamblock 210B is calculated utilizing the stored XOR parity information at step 530A or at step 540A. This combined XOR parity information may be stored in temporary storage, such as DRAM 170 in FIG. 1 or in temporary XOR block 230 of FIG. 2 at step 530B for further calculation of XOR parity information with other streamblocks 210C-210H. In other embodiments, SSD 102 may skip step 530B and store the combined XOR in permanent memory, such as to permanent XOR block 220, at step 540B. For example, temporary memory may be unavailable or the combined XOR parity information may be a final XOR parity information.

SSD 102 may use the stored combined XOR parity information at step 530B to calculate additional XOR parity information of one or more of the other word lines of streamblocks 210C-210H. For example, at step 510C, SSD 102 receives a third data stream from host 101. SSD 102 may write to a word line 260 of streamblock 210C simultaneously or sequentially with step 510B. At step 520C, a combined XOR parity information for the word line 260 of streamblock 210C is calculated utilizing the stored XOR parity information at 530B or at step 540B. This combined XOR parity information may be stored in temporary storage, such as DRAM 170 in FIG. 1 or in temporary XOR block 230 of FIG. 2 at step 530C for further calculation of XOR parity information with other streamblocks 210D-210H. In other embodiments, SSD 102 may skip step 530C and store the combined XOR in permanent memory, such as to permanent XOR block 220, at 540C. For example, temporary memory may be unavailable or the combined XOR parity information may be a final XOR parity information.

The final combined XOR parity information is stored in permanent XOR block 220 in the same superblock 200 as the data streams stored in streamblocks 210A-210H. Embodiments as described in FIG. 5 may be used to advantage in handling asynchronous writes of streamblocks 210A-H from different data streams. For example, SSD may complete writing of word lines to the streamblocks at different times and in different orders. If data streams are received at different speeds, then the XOR parity information from the streamblock stripe that has completed writing to the particular streamblock will be written into the temporary XOR block to be used in calculation of a final XOR parity information to be stored in permanent XOR block 220. Embodiments of flow chart 500 may be used to advantage to reduce multiple writes to permanent XOR block 220 by utilizing temporary storage and by calculating XOR parity information across a plurality of streamblocks 210.

Embodiments in FIG. 5 are described in reference to calculating XOR parity information on a word line basis. In other embodiments, XOR parity information may be calculated based upon other elements, such as on memory pages, on a group of word lines, or word lines from the same streamblock.

Figure 6:
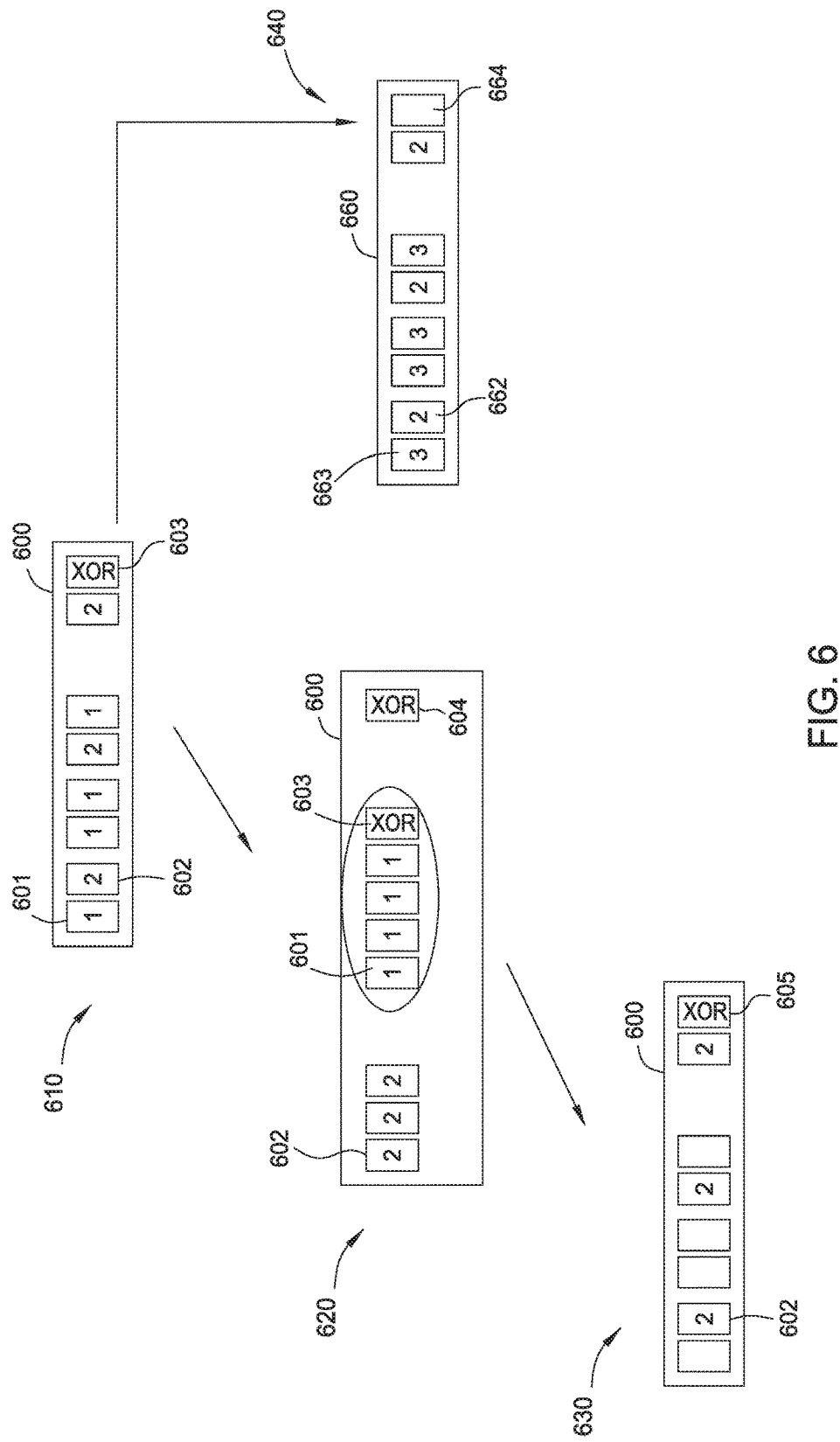
FIG. 6 is a schematic diagram of operating a SSD utilizing streamblocks and erasing streamblocks.

FIG. 6 is a schematic diagram of operating a SSD utilizing streamblocks and erasing streamblocks. For illustration purposes, embodiments will be described in reference to SSD 102 of FIG. 1.

At process 610, SSD 102 provides a closed superblock 600 in which streamblocks 601 contain data from a first data stream and streamblocks 602 contain data from a second data stream. At process 620, SSD 102 erases the streamblocks 601 and the erased streamblocks 601 are sent to a free pool for subsequent use. The combined XOR parity information 603 calculated from streamblocks 601 and streamblocks 602 may also be erased, and a new XOR parity information 604 re-calculated from remaining streamblocks 602 may be stored in superblock 600 or stored in temporary memory. At process 630, SSD 102 may write a new data stream in the erased or available streamblocks of superblock 600 and a new XOR parity information 605 may be calculated from the new data and XOR parity information 604_and stored in superblock 600.

In another embodiment, at process 640, SSD 102 may erase the entire superblock 600 from process 610 and re-write the second data stream in streamblocks 602 to a new superblock 660. The second data stream is re-written to streamblocks 662 along with a third data stream written or re-written to streamblocks 663. A new XOR parity information of streamblocks 662, 663 may be calculated and stored in XOR permanent storage block 664 of superblock 660.

Certain embodiments described herein provide one or more of the following aspects. The endurance, reliability and performance of SSDs receiving multiple data streams are extended by using one or a small number of open superblocks. Utilizing streamblocks within a superblock allow a data stream to be written to the same pool of physical blocks while still maintaining the sequential nature of the workload. Fewer writes to a XOR permanent block is enabled since XOR parity information is calculated together for two or more streamblocks or calculated using a temporary XOR block. The write amplification factor under multiple stream workload is reduced since less data is move and rewritten at garbage collection.

Embodiments of operating a SSD described in reference to FIG. 4, FIG. 5, and FIG. 6 may be performed on other SSD besides SSD 102 of FIG. 1 and other superblock configurations beside the superblock configuration of FIG. 2. While the foregoing is directed to embodiments of the present disclosure, other and further embodiments of the disclosure may be devised without departing from the basic scope thereof, and the scope thereof is determined by the claims that follow.

What is claimed is:

1. A method of operating a solid state drive, comprising:
organizing a non-volatile memory into a plurality of superblocks, each superblock comprising a plurality of streamblocks, each streamblock of the plurality of streamblocks comprising a plurality of blocks of NAND flash memory cells;
receiving a first data stream and a second data stream;
identifying an open superblock;
identifying a plurality of available streamblocks from the open superblock;
assigning first received data stream to one of the plurality of available streamblocks from the open superblock; and
assigning the second received data stream to another one of the plurality of available streamblocks from the open superblock.

2. The method of claim 1, wherein assigning the first received data stream to one of the plurality of available streamblocks from the open superblock comprises assigning the first received data stream to two or more of plurality of the available streamblocks from the open superblock.

3. The method of claim 1, wherein the one of the plurality of available streamblocks is partially filled with data from a stale data stream.

4. The method of claim 1, further comprising assigning the received first data stream and the received second data stream to a separate streamblocks from a new superblock when there is no identified open superblock.

5. The method of claim 1, further comprising assigning the received first data stream and the received second data stream to a separate streamblocks from a new superblock when there is no identified available streamblock from the open superblock.

6. A method of operating a solid state drive, comprising:
organizing a non-volatile memory comprising a superblock, the superblock having a first streamblock comprising a first set of blocks of NAND flash memory cells and a second streamblock comprising a second set of blocks of NAND flash memory cells;
receiving a first data stream and a second data stream;
writing the first data stream to the first streamblock and writing the second data stream to the second streamblock; and
calculating a combined exclusive OR (XOR) parity information for the first streamblock and the second streamblock.

7. The method of claim 6, further comprising storing the combined XOR parity information in permanent storage.

8. The method of claim 7, wherein the permanent storage is from the superblock.

9. A method of operating a solid state drive, comprising:
organizing a non-volatile memory comprising a superblock, the superblock having a first streamblock and a second streamblock;
receiving a first data stream and a second data stream;
writing the first data stream to the first streamblock and writing the second data stream to the second streamblock; and
calculating a combined exclusive OR (XOR) parity information for the first streamblock and the second streamblock,
wherein calculating the combined XOR parity information for the first streamblock and the second streamblock comprises:
calculating a XOR parity information for the first streamblock;
storing the XOR parity information for the first streamblock in temporary storage; and
calculating the combined XOR parity information utilizing the stored XOR parity information in temporary storage.

10. The method of claim 9, wherein the temporary storage is from a separate non-volatile memory die than the first streamblock and the second streamblock.

11. A method of operating a solid state drive comprising:
organizing non-volatile memory into a plurality of superblocks, each superblock comprising a plurality of streamblocks and a permanent exclusive OR (XOR) block, each streamblock of the plurality of streamblocks comprising a plurality of blocks of NAND flash memory cells;
writing a first data stream to a first set of streamblocks within one of the superblocks; and
writing a second data stream to a second set of streamblocks within the one of the superblocks.

12. The method of claim 11, further comprising:
calculating a combined XOR parity information for the first set of streamblocks and the second set of streamblocks; and
storing the combined XOR parity information in the permanent XOR block within the one of the superblocks.

13. The method of claim 11, further comprising:
erasing the one of the superblocks;
re-writing the second data stream to a first set of streamblocks within another one of the superblocks; and
writing a third data stream to a second set of streamblocks within the another one of the superblocks.

14. The method of claim 13, further comprising:
calculating a combined XOR parity information for the first set of streamblocks of the another one of the superblocks and the second set of streamblocks of the another one of the superblocks; and
storing the combined XOR parity information in the permanent XOR block of the another one of the superblocks.

15. A method of operating a solid state drive comprising:
organizing non-volatile memory into a plurality of superblocks, each superblock comprising a plurality of streamblocks and a permanent exclusive OR (XOR) block;
writing a first data stream to a first set of streamblocks within one of the superblocks;
writing a second data stream to a second set of streamblocks within the one of the superblocks;
calculating a combined XOR parity information for the first set of streamblocks and the second set of streamblocks;
storing the combined XOR parity information in the permanent XOR block within the one of the superblocks;
erasing the first set of streamblocks and the permanent XOR block within the one of the superblocks;
re-calculating a XOR parity information for the second set of streamblocks;
storing the re-calculated XOR parity information for the second set of streamblocks;
writing a third data stream to a third set of streamblocks within the one of the superblocks, the third set of streamblocks containing at least one of the erased streamblocks;
re-calculating a combined XOR parity information for the second set of streamblocks and the third set of streamblocks; and
storing the re-calculated combined XOR parity information in the permanent XOR block within the one of the superblocks.

16. A solid state drive, comprising:
a controller;
a non-volatile memory comprising a plurality of superblocks, each superblock comprising a plurality of streamblocks, each streamblock of the plurality of streamblocks comprising a plurality of blocks of NAND memory cells; and
a plurality of memory operation instructions that, when executed by the controller, cause the controller to:
receive a first data stream;
assign the first data stream to a first streamblock from a first superblock;
receive a second data stream; and
assign the second data stream to a second streamblock from the first superblock.

17. The solid state drive of claim 16, wherein the memory operation instructions further cause the controller to calculate a exclusive OR (XOR) parity information from the first streamblock.

18. The solid state drive of claim 17, wherein the memory operation instructions further cause the controller to store the XOR parity information in a temporary XOR storage.

19. The solid state drive of claim 16, wherein the memory operation instructions further cause the controller to calculate a combined exclusive OR (XOR) parity information from the first streamblock and the second streamblock.

20. The solid state drive of claim 19, wherein the memory operation instructions further cause the controller to store the combined XOR parity information in a permanent XOR storage.

21. A solid state drive, comprising:
a controller;

a non-volatile memory comprising a plurality of superblocks, each superblock comprising a plurality of streamblocks; and a plurality of memory operation instructions that, when executed by the controller, cause the controller to:
receive a first data stream;
assign the first data stream to a first streamblock from a first superblock;
receive a second data stream;
assign the second data stream to a second streamblock from the first superblock;
calculate a exclusive OR (XOR) parity information from the first streamblock;
store the XOR parity information in a temporary XOR storage; and
calculate a combined XOR parity information from stored parity information and from the second streamblock.

22. A solid state drive, comprising:
a controller;
a means for organizing a non-volatile memory into a plurality of superblocks, each superblock comprising a plurality of streamblocks, each streamblock of the plurality of streamblocks comprising a plurality of blocks of NAND flash memory cells; and
a plurality of memory operation instructions that, when executed by the controller, cause the controller to:
receive a plurality of data streams; and
store the plurality of data streams to separate streamblocks of one of the plurality of superblocks.

23. The solid state drive of claim 22, wherein the one of the superblock further comprises a exclusive OR (XOR) permanent storage, wherein the plurality of memory operation instructions further cause the controller to store XOR parity information of the plurality of data stream to the XOR permanent storage.

24. The solid state drive of claim 23, wherein the organizing means further comprises exclusive OR (XOR) temporary storage separate from the plurality of superblocks, wherein the plurality of memory operation instructions further cause the controller to store XOR parity information of the plurality of data stream to the XOR permanent storage.

* * * * *